Nov. 18, 1969  G. E. RICHMOND  3,478,433
TOOTH CLEANING TOOL
Filed April 15, 1968
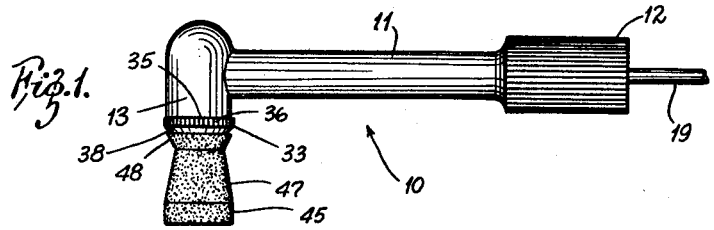
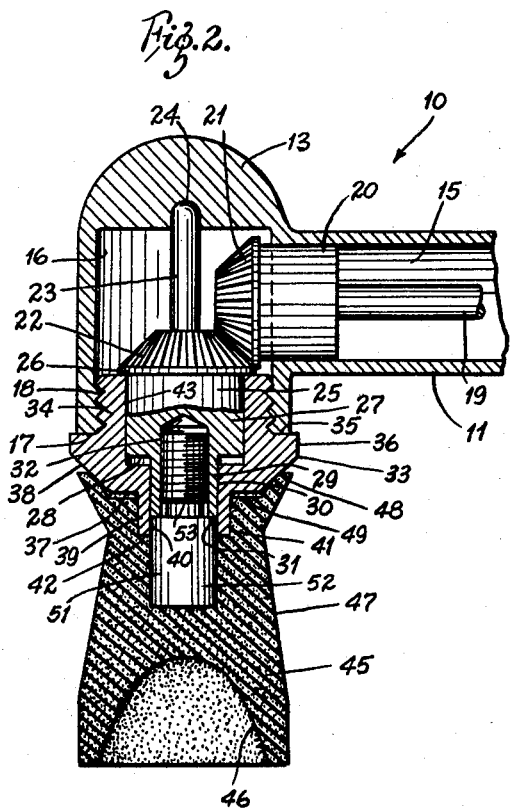
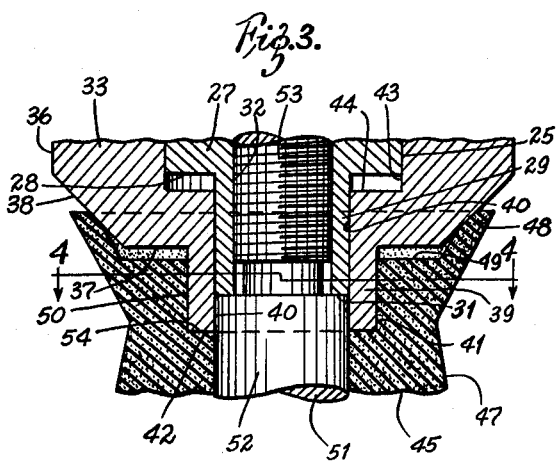
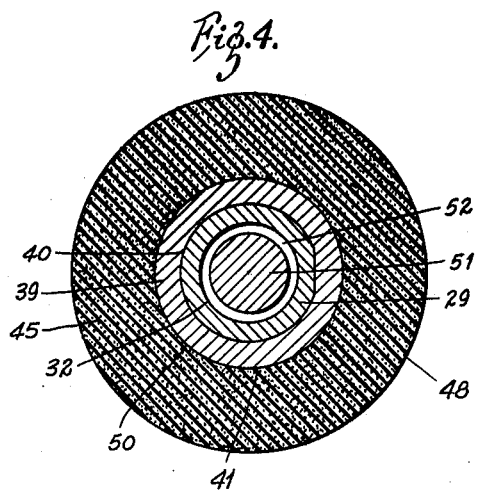
INVENTOR:
GEORGE E. RICHMOND
BY Kingsland, Rogers, Ezell, Eilers + Robbins
ATTORNEYS United States Patent Office 3,478,433
Patented Nov. 18, 1969

3,478,433
TOOTH CLEANING TOOL
George E. Richmond, 828 Fernview,
St. Louis, Mo. 63141
Continuation-in-part of application Ser. No. 508,785,
Nov. 19, 1965. This application Apr. 15, 1968, Ser.
No. 721,288
Int. Cl. A61c 3/06
U.S. Cl. 32—59                                      8 Claims

ABSTRACT OF THE DISCLOSURE

A tooth polisher having rotating, yieldable surfaces which rub against stationary surfaces to maintain seal barriers for preventing pumice from entering the space containing moving parts in the angle member. The polisher has an annular skirt biased into rubbing contact with a cap mounted on the housing for the driving mechanism. A sleeve extending from the cap provides a second bearing seal with the polisher.

BRIEF DESCRIPTION OF THE INVENTION

This application is a continuation-in-part of application Ser. No. 508,785, now Patent No. 3,407,502, filed Nov. 19, 1965.

The tooth polishing machine has an angle that has communicating right angle recesses in it for housing meshed gears, one of which is driven by a power mechanism which is not part of this invention, and the other of which is connected to a polisher. A metal cap fits over the end of the opening through which the latter gear extends. The gear to which the polisher is connected has a mandrel extension in the form of a hub or sleeve extending through the bearing cap nut. The polisher is molded about a screw that is threaded into the mandrel extension or molded to snap over a hub.

While the fit between the mandrel extension and the metal cap is close, nevertheless, the metal cap is stationary with the angle, whereas the mandrel extension rotates with the gears, and this relative movement requires that there be slight space between the mandrel extension and the metal cap. In conventional polishing machines, it is through this space that pumice has entered and ultimately caused excessive wear, cloggings, and failures in the rotation transmitting mechanisms.

In the present invention, the metal cap is provided with an extension or sleeve that extends to the end or beyond the mandrel extension into a recess formed in the base of the polisher. Pressed or rubbing fits are maintained between the outer surface of the cap sleeve and the sidewall of the recess in the polisher. Also, the bottom of the rubber cup (or polisher) recess rubs against the lower end of the sleeve. These rubbing surfaces provide pumice seals. An additional pumice seal is provided by a skirt on the polisher that presses and rubs against a frustoconical side of the cap.

Other objects and advantages will be apparent to those skilled in the art.

This invention is an improvement on the aforesaid application Ser. No. 508,785, now Patent No. 3,407,502, in that the screw head in the pending application overlaps and rubs against the sleeve of the cap, producing rubbing of metal against metal. In this application, the size of the screw head is reduced and the rubbing seal is provided on the rubber polisher rubbing against the end of the screw.

In the drawing:

FIGURE 1 is a side elevation view of an angle showing the metal cap and polisher in operating positions;

FIGURE 2 is an enlarged fragmentary view in longitudinal medial section through the angle, the metal cap, and the polisher;

FIGURE 3 is a further enlarged fragmentary view of the central portion of FIGURE 2; and FIGURE 4 is a view in section taken along the line 4—4 of FIGURE 3.

DETAILED DESCRIPTION OF THE INVENTION

FIGURE 1 illustrates the operating end 10 of a tooth polishing machine. This machine comprises an angle member 11 having an end 12 adapted to be threaded to or otherwise connected to an extension arm which transmits driving power to parts connected to the angle member. The angle member 11 has a head 13 at its other end.

There is a passage 15 through the angle member 11 which communicates at right angles with a recess 16 in the head 13. The recess 16 is open at the lower end 17 of the head 13 and there are internal threads 18 adjacent the end 17. A shaft 19 extends through the angle member 11 and is connected to the base 20 of a bevel gear 21 that is positioned just beyond the end of the recess 16.

There is another bevel gear 22 that meshes with the gear 21. It has a central pin extension 23 that fits within a recess 24 to position the gear 22. There is a mandrel 25 extending from the base 26 of the gear 22. The mandrel 25 has a cylindrical side wall 27 the diameter of which is slightly less than the diameter of the base 26 so that the base 26 provides an annular shoulder beyond the cylindrical side 27. At the base of the mandrel 25, there is an annular shoulder 28 extending radially inwardly and leading to a mandrel extension 29 of smaller diameter than the diameter of the mandrel 25. The mandrel extension 29 also has a cylindrical outer surface 30 between the annular shoulder 28 and the lower end 31 of the mandrel extension. A hole 32 is tapped into the mandrel extension 29.

A metal cap 33 has an externally threaded sleeve 34 that threads into the head 13. A radial shoulder 35 bears against the lower end 17 of the head 13. The metal cap 33 has a cylindrical upper wall 36 and a horizontal lower wall 37, with a frustoconical wall 38 therebetween. A thin sleeve 39 having inner and outer walls 40 and 41 extends downwardly from the horizontal wall 37 and terminates in a knife-edge at its lower end 42. There is a recess 43 in the metal cap 33 that extends downwardly to a radially inwardly extending annular shoulder 44.

The cap 33 threads into the head 13 as shown in FIGURE 2 until the shoulder 35 bears tightly against the lower end 17. In this position, the recess 43 receives the mandrel 25 in a very close fit, with the upper end of the sleeve 34 holding the gear 22 in place by bearing against its base 26, and the inner wall 40 of the sleeve 39 receives the mandrel extension 29 with a very close fit.

A polisher 45 is standard to the extent that it is made of conventional rubber and has a pocket 46 at its working end, a tapered side wall 47, and an annular skirt 48 above a base portion 49. A cylindrical recess 50 extends downwardly from the base portion 49. A screw 51 has a head 52 bonded to the polisher 45 during molding. The shank 53 of the screw 51 is of smaller diameter than the head 52 and is threaded into the mandrel extension 29. The diameter of the head 52 is the same or smaller than the outside diameter of the sleeve 29, and the screw head 52 is tightened tightly against the lower end 31 of the sleeve 29. The sleeve 39 projects below the lower end 31 of the sleeve, 29 and both the sleeve 29 and the screw head 52 rotate within the sleeve 39.

The recess 50 of the rubber cup is slightly smaller in diameter than the sleeve 39. Also, the bottom 54 of the recess 50 presses against the knife edge 42 of the sleeve 39 when the screw 51 is threaded tightly in place. The sleeve 39 and mandrel extension 29 project into the recess 50 with a rubbing fit between the side wall of the recess 50 and the external side wall 41 of the tubular extension 39.

Thus, the rubbing of the side wall of the recess 50 against the sleeve 39 provides one seal area, and the rubbing of the bottom 54 of the recess 50 against the knife edge 42 provides a second seal area. A third seal area is provided by the annular skirt 48 of the rubber cup which is formed to bias against the frustoconical side 38 of the cap 33, as shown in FIGURE 3. In other words, as the screw 51 is tightened in place, the wall 38 of the cap 33 spreads the skirt 48 outwardly.

In operation, the shaft 19 is connected to a driving mechanism (not shown) to drive the gears 21 and 22. Rotation of the gear 22 rotates the mandrel 25 and the mandrel extension 29 and rotates the polisher 45. The mandrel 25 rotates within the inner wall 40 and the mandrel extension 29 rotates within the sleeve 39 of the stationary cap 33. The polisher 45 rotates about the stationary cap 33, with the skirt 48 rubbing against the frustoconical wall 38, the side wall of the recess 50 rubbing against the side 41 of the sleeve 39, and the bottom 54 of the recess 50 rubbing against the knife edge 42.

Because of the design of the bearing cap nut 33 with the sleeve 39, and the complementary design of the polisher 45 with the recess or well 50, together with the mandrel extension 29, pumice cannot enter the area of the gears 21 and 22. First, the pressure of the skirt 48 against the frustoconical wall 38 provides a seal. Second, the pressure of the side wall of the recess 50 against the sleeve 39 provides a seal. Third, the pressure of the bottom 54 of the recess 50 against the knife edge 42 provides a seal. It has been found that this design effectively prevents such entry of pumice into the working parts of the apparatus. In the pumice seals that are provided, rubbing of metal against metal is avoided.

Dimensions of the bearing cap nut 33 may be varied and still maintain the concept of this invention, but for illustrative purposes, the bearing cap nut 33 is made with a sleeve 39 having an external length of about 0.0525 inch, an external diameter of about 0.110 inch, and an internal diameter of about 0.094 inch. Thus, the wall thickness of the sleeve 39 is about 0.008 inch.

What is claimed is:
1. A tooth cleaning tool comprising an angle member having internal recess means for housing rotatable driving parts, a cap mounted over the end of one of the recess means, a sleeve on the cap extending away from the angle member, a mandrel extension connected to one of the driving parts and extending through the cap and into the sleeve, a polisher attached to the mandrel extension, the polisher having an annular skirt biased into rubbing contact with the cap to provide a first bearing surface, and the polisher having a second bearing surface that maintains rubbing contact with the lower end of the sleeve on the cap to provide rubbing seals during rotation of the polisher.

2. The apparatus of claim 1 including a screw threaded into the mandrel extension, the screw having a head projecting beyond the mandrel extension, the polisher being bonded to the head of the screw.

3. The apparatus of claim 2 wherein the mandrel extension comprises a tubular sleeve, the outside diameter of the tubular sleeve being substantially equal to the diameter of the screw head.

4. The apparatus of claim 1 wherein the sleeve on the cap projects beyond the end of the mandrel extension.

5. The apparatus of claim 1 wherein the sleeve on the cap terminates in a knife-edge.

6. The apparatus of claim 2 wherein the sleeve on the cap has a wall thickness of about 0.2 mm.

7. The apparatus of claim 1 wherein the polisher has a recess for receiving the sleeve on the cap, the side wall of the recess being sized to rub against the sidewall of the sleeve during rotation of the polisher.

8. The apparatus of claim 1 wherein the cap has a frustoconical sidewall, and the polisher skirt rubs against the frustoconical sidewall.

References Cited
UNITED STATES PATENTS 1,720,017  7/1929  Touchstone _____ 32—59 X ANTONIO F. GUIDA, Primary Examiner CHARLES R. WENTZEL, Assistant Examiner